G. K. KANE.
Car Wheel.
No. 5,002.
Patented March 6, 1847.
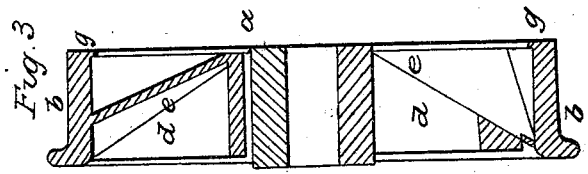
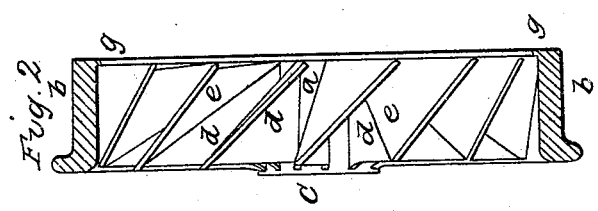
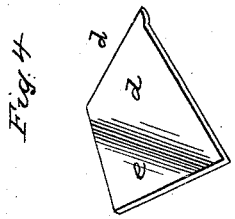
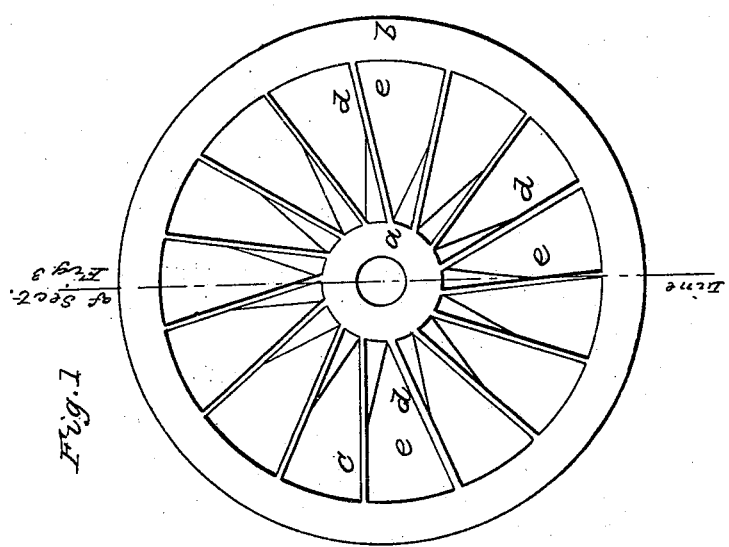
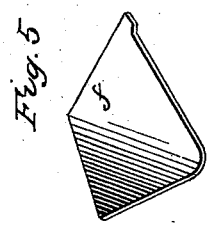

UNITED STATES PATENT OFFICE.

GODLOVE K. KANE, OF YORK, PENNSYLVANIA.

CAR-WHEEL.

Specification of Letters Patent No. 5,002, dated March 6, 1847.

*To all whom it may concern:*

Be it known that I, GODLOVE K. KANE, of the town and county of York and State of Pennsylvania, have invented a new and useful Improvement in Wheels for Railroad-Cars, etc., and that the following is a full, clear, and exact description of the principle or character which distinguishes it from all other things before known and of the manner of making, constructing, and using the same, reference being had to the accompanying drawings, making part of this specification, in which—

Figure 1 is an elevation of the wheel; Fig. 2, a view of the periphery with the rim removed to show the form of the ends of the spokes; Fig. 3, a vertical section parallel with the axis; Fig. 4, a separate view of one of the spokes, and Fig. 5, a modification thereof.

The same letters indicate like parts in all the figures.

The object of my invention is to make rail road car wheels of greater strength, and with a better distribution of the connections between the hub and rim and the lines of support to the latter, with a less weight of metal than by any other known plan; and this I have attained by making the spokes of thin plates connected with the hub in lines parallel with the axis thereof and with the rim in lines diagonal therewith, each plate, forming a spoke for this purpose, being bent along a diagonal line extending from one edge of the spoke at its junction with the hub, and to the other edge at its junction with the rim, thus forming two planes at an angle with each other corresponding with the lines of junction of the spoke with the hub and rim.

In the accompanying drawings (*a*) represents the hub and (*b*) the rim of the wheel connected together by means of the plates or spokes (*c*) formed of two planes the one (*d*) parallel with the hub, and gradually diminishing in width from its junction therewith to the rim and the other (*e*) connected with the rim diagonally and gradually diminishing in width in the reverse direction of the part (*d*); the junction of these two parts being either an angle as represented in Figs. 1, 2, 3 and 4, or a curve as represented in Fig. 5. The junction of the spokes and hub may be curved as at (*f*) or in any other form desired, and to give additional strength small flanches may be added at the junction of the spokes and rim and parallel with the plane of the wheel, as at (*g*). It will be observed that that part of the spoke which is parallel with the axis of the hub is not in the direction of a line radiating from the center of the wheel; but that the radius passes through its junctions with the hub and the middle of its width at the rim of the wheel, so that the whole width of the spoke, at the rim, forms the basis to support the weight which exerts its force in the direction of the radial line, to prevent the bending of the spoke in the direction of the plane of the wheel, and that in the rotation of the wheel the radial line, representing the direction of the weight, does not leave one spoke before it passes to the next, thus giving an efficient support to the entire circumference of the tread. And in like manner it will be obvious that the hub cannot be beat out of its true line as that part of the spokes which is parallel with the axis of the hub presents its entire width to resist any such tendency. Thus it will be obvious that while this form of spokes with a small weight of metal resists the two great forces which tend to break or bend them, the angle which is formed by the two planes composing each spoke presents a complete system of bracing which will effectually resist any injurious force from any and all directions.

What I claim as my invention and desire to secure by Letters Patent, is—

Making the spokes, which unite the hub and rim of rail road car wheels, each of a plate one portion of which is parallel with the axis of the hub, and extending from the hub to the rim, and the other connected with the rim, in a line diagonal with the plane of the wheel and extending from the rim to the hub, the first gradually diminishing in width from the hub to the rim, and the other gradually diminishing from the rim to the hub, substantially in the manner and for the purpose described.

GODLOVE K. KANE.

Witnesses:
GEO. A. BAMITZ,
JACOB GLESSNER.